Nov. 22, 1966  GEORGE TROJANOWSKI NOW BY  3,287,481
JUDICIAL CHANGE OF NAME
GEORGE TROJAN ET AL
PROCESS FOR MOLDING ARTICLES HAVING PEARLESCENT LUSTER
Original Filed Dec. 5, 1960
FIG. 1
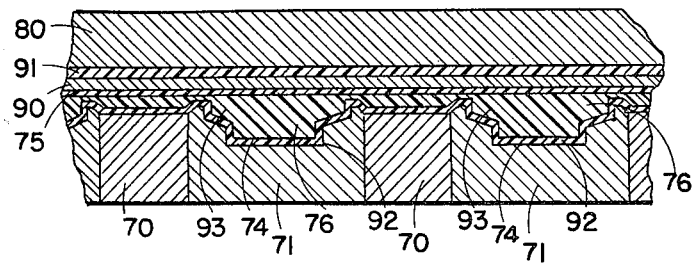
FIG. 4
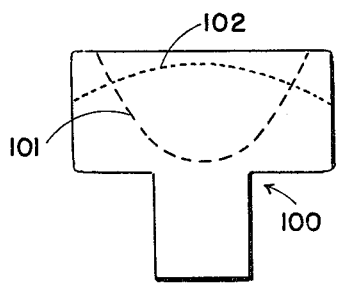
FIG. 3
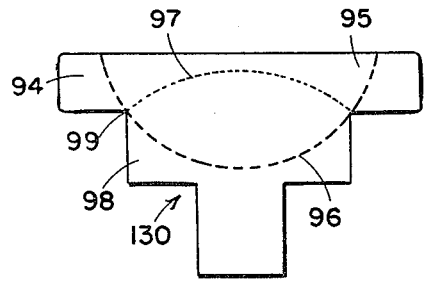
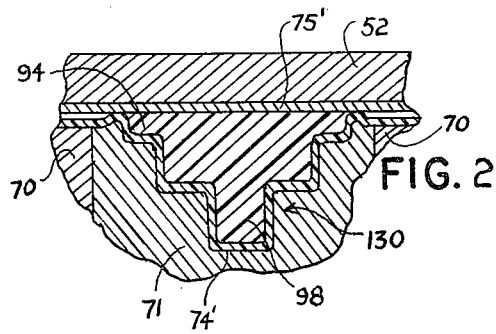
FIG. 2
*INVENTORS:*
George S. Trojan
Lawrence Brandt
by *Joseph Hirschman*
ATTORNEY.

3,287,481
PROCESS FOR MOLDING ARTICLES HAVING PEARLESCENT LUSTER
George Trojanowski, East Meadow, and Lawrence Brandt, Huntington, N.Y.; said George Trojanowski, now by Judicial change of name, George Trojan, assignors to Oceana International, Inc., New York, N.Y., a corporation of New York
Original application Dec. 5, 1960, Ser. No. 73,774, now Patent No. 3,216,060, dated Nov. 9, 1965. Divided and this application Sept. 24, 1964, Ser. No. 405,640
2 Claims. (Cl. 264—139)

The present application is a division of our copending application Serial No. 73,774, filed December 5, 1960, which issued on November 9, 1965, as Patent No. 3,216,060 and which is a continuation-in-part, respectively, of our earlier applications Serial Nos. 568,768 and 568,769, both filed March 1, 1956, and both of which issued on December 6, 1965, as Patents Nos. 2,962,764 and 2,962,767, respectively.

The present invention relates to an improved molding process for the manufacture of molded articles of various kinds from heat-hardenable, substantially liquid resins, and particularly from addition type resins of thermosetting character.

It is the general object of the invention to provide a molding process of the type indicated in which an addition type resin is employed having suspended therein a pearl essence of organic or inorganic nature pursuant to which articles are obtained, such as shank and shirt buttons, having a pearlescent surface over the whole face thereof.

More specifically, it is an object of the invention to provide moldings or molded blanks, such as button blanks, whose face is enlarged to such an extent that upon cutting away of excess material, the finished face of the blank presents a pearlescent appearance over the whole surface thereof.

It is a further object of the invention to vary the character of the lustrous surface by the use of inserts in the mold having relatively rough surfaces, such as sheets of cardboard or the like, which may or may not be used together with an additional sheet having a relatively hard, flat surface which serves to modify the effect of the relatively rough cardboard surfaces. Thereby ripple or wave effects of greater or lesser degree are obtained which more closely resemble true mother-of-pearl.

As the invention is of particular value for the simultaneous molding of a large number of small articles, the molds shown in the drawings are constructed for use in molding buttons, and the invention will be further described in connection with the manufacture of such articles, and with the apparatus with which the process can be carried out.

In the accompanying drawing,

FIG. 1 shows in vertical section, a portion of a heated two-part mold of the type shown in our above-mentioned patents, the mold being provided with cavities shaped to produce shirt button blanks, the mold being shown in the closed condition;

FIG. 2 shows a portion of a mold in vertical section whose cavities are designed for producing molded shank button blanks, the mold being shown in the closed condition;

FIG. 3 is an enlarged view showing a shank button blank prior to the finishing operations and indicating the boundary of the lustrous zone and the final shape of the face of the button, while FIG. 4 shows a shank button blank as molded by prior methods and indicating the limited area or "eye" of lustrous material surrounded by a ring of relatively dull appearance.

It will be understood that in the practice of the process hereinafter described, there can be employed the two-part molding apparatus, the materials, and likewise the general method of molding of a liquid or semi-liquid thermo-setting resin of the addition type, such as polyester resins, described in our above-mentioned patents, and as the apparatus is shown in detail therein, it is deemed to be unnecessary to describe the same herein or to illustrate the complete apparatus in the accompanying drawing. The disclosures of said patents, other than that presented herein, are accordingly incorporated into the present application by reference.

It will be further understood that in the practice of our improved process, the highly stretchable films, preferably polyvinyl alcohol films, disclosed in our above-mentioned patents will be employed; and although mold cavities may be present in both the upper and lower parts of the two-part mold, in the accompanying drawing there are shown molds in which, for the sake of simplicity, the cavities are all located in only one of the mold parts.

Referring to FIG. 1, the lower mold part is indicated at 70, while the upper mold part is shown at 80. The lower mold part contains the die inserts 71 which are provided with the mold cavities 92.

As described in the aforementioned patents, in the open condition of the molds, there is first placed over the empty cavities 92 in the lower mold part a pliable and highly stretchable plastic film 74, preferably a polyvinyl alcohol film, and upon this film there is placed a mass of resin shown in part at 76, sufficient to fill all of the cavities and to provide material for the "flash" between the cavities. The resin contains an organic or inorganic "pearl essence" for producing a pearlescent or mother-of-pearl luster.

As already indicated, the upper mold part contains no cavities and presents a continuously flat, smooth surface. Over the mass of resin lying in the lower film, there is placed a plastic film 75 which may or may not be made of polyvinyl alcohol, i.e., it need not be highly stretchable, since this film is not subjected to stretching. It may, for example, be made of cellophane, cellulose acetate, and the like.

Above the film 75, there is preferably placed a sheet 90 having a relatively rough surface and serving to cause ripples in the compressed resin, as the mold is closed. This sheet can consist of cardboard or the like, i.e., having a relatively rough surface. On the sheet 90 there can, if desired, be superposed a sheet 91 having a relatively smooth surface, such as a phenolic resin laminate.

Upon closing of the mold, the resin is subjected to pressure, and forces the film 74 to stretch and line the walls of the cavities, as is clearly shown in FIG. 1. The resin is then subjected to heat until the resin has been cured, or until it has attained the solid condition, the final cure being then conducted in a separate heating oven or other heating device.

FIG. 1 shows a two-part mold with cavities designed for producing shirt button blanks. In FIG. 2 there is shown a fragment of a similar mold in which the cavities are shaped to produce a shank button blank. In the process carried out according to FIG. 2, the cardboard sheet 90 and phenolic resin laminate 91 have been omitted. As shown in FIG. 2, the highly stretchable film 74' has been forced by the resin, upon closing of the mold, into the cavity 98 in the die 71. The numeral 52 indicates the upper mold part, while the lower mold part is shown at 70. The upper film or sheet which need not be stretchable, is shown at 75', and can be made of paper or plastic. As in the case of the mold of FIG. 1, there can be employed separate films, or they can be formed into a bag, as described in the above-mentioned Patents Nos. 2,862,767 and 3,216,060.

Our invention contemplates the molding of various kinds of objects including articles having substantial thickness or of relatively complex form, such as shank buttons and objects of even more irregular form. Accordingly, the films 74 and 75 must be capable of considerable stretch or elongation without rupture as they are drawn or pulled into the mold cavity by the flowing resin and line the walls of the cavities. For some purposes a film capable of stretching to the extent of only about 100% in all directions will be found satisfactory; however, for thicker objects or more complicated shapes, a stretch of 400 to 600% or even higher is preferred.

We have found polyvinyl alcohol films to be particularly well suited for use in our process, as they are strong, have a high stretchability and are heat-resistant. Polyvinyl alcohol films can withstand the temperature employed in our process and are characterized by an elongation of 400 to 600% and even more, so that quite complicated objects can be molded with the aid of such film.

Tests have shown that cellophane is not suited for use in the molding of articles having any considerable depth, as it does not have sufficient elongation before rupture sets in. It can, however, be used where the cavity is entirely in one mold part, the other mold part presenting a substantially flat surface, and against such flat surface the cellophane sheet can be employed. With such cellophane sheet there would then have to be employed a film capable of being stretched to the extent of at least about 100%, such as a film of polyvinyl alcohol, which would be placed against the mold part carrying the cavities, or the deeper cavities.

For small shank buttons, the polyvinyl alcohol film can have a thickness of 0.0015 to 0.003 inch. For flat shirt buttons, this thickness can range from 0.001 to 0.002 inch. In general, for objects requiring a deeper draw of the films, the greater thicknesses of films will be used.

As already indicated, the molding compositions employed in our process comprise liquid or semi-liquid thermosetting resins of the addition type, i.e., polymerizable resins or mixtures of resinous condensates and monomers which do not liberate water of condensation or other vapors or gases on gelling or polymerizing. Suitable addition type thermosetting resins are the known polyester and epoxy resins, various formulations of which are commercially available. We have obtained very satisfactory results with "Laminac" 4120 and 4134 manufactured by American Cyanamid Co. The first of these resins yields a rigid product, while the second produces flexible articles. Mixtures of these compositions may be employed, such as a mixture of 85% to 97% of Laminac 4120 and 15% to 3% of Laminac 4134. Another commercially available group of resins which can be employed are those sold under the trademark "Selectron" by Pittsburgh Plate Glass Co., of which No. 5027 yields relatively rigid, while No. 5124 yields relatively flexible products. As in the case of the Laminac resins, mixtures of Selectron resins may be employed, and likewise mixtures of Laminac and Selectron resins, depending upon the combination of properties desired in the molded articles. Especially after the addition thereto of fillers or pigments, the resinous compositions may be pasty in form at room temperature. Among the epoxy resins that can be used are those sold by Ciba under the trademark "Araldite," and by Shell Chemical Co. under the trademark "Epon." When the catalyzed resins have a short "pot life," the catalyst is added shortly before molding.

Where the resins are quite solid at room temperature, such as certain epoxy resins, they can be fused by heating to a temperature short of gelling, after which the catalyst or catalysts of known character are mixed therewith and the mixture then placed on a film in the heated condition immediately prior to molding.

In molding the Laminac resins, the temperature of the bottom part of the mold can be kept permanently at about 225° F., while the temperature of the top part of the mold is about 195° F., but can be considerably higher, for example 245°–260° F., depending upon the nature and quality of the catalyst and the type of resin employed. The reaction is exothermic in character, so that if larger articles are molded, the mold temperature itself can be lower. The quantity of catalyst contained in the resin will be determined by the cycle period of the molding operation which in turn will depend upon the size or thickness of the molded article.

To produce moldings having a pearlescent luster in accordance with the invention there is incorporated in the resin a quantity of pearl essence, such as fish scales, or known artificial materials, like iridescent flakes. Our process causes considerable flow of the resin, so that the fish scales or other pearlescence-producing material becomes properly oriented to produce very pleasing pearlescent effects. Other known surface appearance-modifying materials can likewise be added to the resin, such as pigments and dyes, and also various inert fillers.

The molding compositions employed in the present invention can be any of those described in our above-mentioned patents, and may be similarly employed.

The completely sealed bag, following deaeration, can be stored for various lengths of time, depending upon the reactivity of the resin and the catalyst, without danger of air bubbles finding their way into the resin. If desired, the bags can be kept under refrigeration until required.

Our process makes it possible to provide the whole surface of the molded article with special surface effects which are integral with the main body of the articles. Thus, the molded articles can be provided with an integral surface layer of any desired color, pattern or texture, by coating the inside surfaces of the upper and lower films with a composition which will fuse with the molding resin 76 into an integral resinous mass. The color, design, light-reflecting properties, texture, and the like, imparted by the coatings on the two films may be harmonious or contrasting. The inside surfaces of the films can be provided with the desired coating by spraying, brushing, stencilling or in any other suitable manner. The coatings can contain a resin of the same character as the molding composition, or it may be of a different type of resin which is miscible or compatible with the molding resin. The resinous coating can be gelled or conditioned in any suitable way in the films before the bag is formed. Special effect coatings can also be applied by reverse roll coating devices, and also can be applied in the form of a solution, after which the solvent is evaporated and the resinous coating heated until the desired consistency is obtained, which, should, however, preferably be short of the final insoluble, infusible condition.

If the coatings on the films are gelled prior to the molding operation, this will prevent any substantial flow of the special effect resin into the mass of molding resin. On the other hand, if some degree of mixing is desired to give a more random effect, the special effect resin can be air-dried until its surface has lost most of its tack. The gelling of the special effect resin can be accomplished either by heat or by the use of a cold-setting catalyst, or by a combination of both. The special effect resins can be transparent, translucent or opaque and with or without internal sheen and without iridescent or pearlescent flakes. Mottled effects can be produced by using a plurality of colors. Polyvinyl alcohol films are especially well adapted for this purpose, because they are hydrophilic in nature and the resinous coating therefore separates readily from the films.

As already indicated, when the mold cavity or cavities are entirely in the bottom mold part, the face of the upper part being then smooth and free from cavities, as in FIGS. 1 and 2, the film facing such upper mold part need not be of highly stretchable character and may consist of cellophane and even of paper or the like. If the paper is sufficiently porous for the resin to penetrate it, this will ordinarily not be a disadvantage, as articles like buttons are turned or ground down to the finished shape. The use of a paper sheet as the second film when the cavities are all in only one part of the mold, the paper sheet being then associated with the mold part presenting a substantially flat surface, is of particular advantage in connection with the use of resins having pearlescent material suspended therein.

As stated hereinabove, in the description of the production of pearlescent effects, the present process causes considerable flow of the resin and this is promoted by the use of the paper sheet, which acts as a heat insulator and thus delays the rise of temperature of the face portion of the moldings to the hardening point, so that a longer interval is allowed for flow of the resin at such face portion. Also, irregularities in the surface of the paper produce waves and ripples in the pearlescent resinous body, thereby more closely simulating natural mother-of-pearl. The paper is preferably in the form of more or less rough cardboard, such as that known commercially as Basis 40 rough chipboard of about 0.065" thickness, or it may be smoother Basis 30 cardboard (about 0.026" thick). It will be apparent that the rougher or more striated the surface of the paper, the more intense will be the ripple effect. To reduce the rippling or wavy effect of the pearlescence, a flat film may be placed in front of the cardboard, such as a film of relatively stiff cellulose acetate of about 0.004" thickness (grade L822M) or 0.002" (grade 8904), both manufactured by Celanese Corporation, or a sheet of linen base phenolic laminate, or a highly calendared kraft board ("Pressboard") of 0.010" thickness, all of which will oppose some resistance to the distorting effect of the rough paper surface.

In accordance with the invention the above-described apparatus is employed for the manufacture of articles, such as buttons, both sew through (e.g. shirt) buttons and shank buttons characterized by a uniform pearlescent appearance over the whole face of the button (or other molded article) instead of being localized at the center of the button. To this end, the cavities for the molded article are so shaped that the face of the molded article is so enlarged that the pearlescent area extends at least to, and even slightly beyond, the periphery of the finished article. Upon cutting or grinding away the excess material, the pearlescence will extend over the whole face of the button or other article. For a more or less uniform pearly appearance, the die cavity can be wholly in one mold part, as in FIGS. 5 and 6, or be partly in each mold part; however, for the wavy or ripply effects described above, the cavities are best all located in one mold part.

By the provision of the enlarged flange or "head," referred to above, in accordance with the invention, we insure that upon the turning or cutting of the button blank to the finished size, the lustrous or pearlescent surface appearance will extend to the periphery of the button. This will be better understood by reference to FIG. 4 which shows a shank button blank 100 molded in the known type of cavity which is of generally the same shape as the finished button. In such molding, made with a resin having a pearl essence suspended therein, the lustrous region or zone is generally bounded by the orientation line indicated by the dash line 101. It will be seen that this dash line intersects the upper surface of the molding or blank at some distance from the sides of the blank. As a result, when the button surface is ground and polished to the shape indicated by the dotted line 102, only the central portion of the upper surface will be of lustrous appearance, while the side portions will be of a lower degree of luster or practically non-lustrous. This will produce an "eye," also known as a "cat's eye" in the center of the face of the button, which reduces the market appeal of the button and hence its value.

We have found that by making the face region of the button blank of enlarged diameter for a certain depth, the orientation or demarcation line or area is so shifted that when the button is then cut or turned to its finished size, the orientation line or area will not intersect the facial plane of the button inside of its periphery, i.e., the finished face of the button will be entirely within the highly lustrous zone of the blank. The orientation line or area will either intersect the facial plane exactly at the periphery of the button, or it will intersect the side of the button at some distance beneath the facial plane of the button. This is indicated in FIG. 3 which illustrates a shank button blank 130 produced in accordance with the invention, the enlarged head or flange being indicated by the numeral 94. Here the orientation line representing the demarcation between the lustrous region 95 and the lower luster or non-lustrous region 94 is indicated at 96. The shape of the face of the finished and polished button is indicated by the dotted line 97. It will be seen that the whole surface of the area represented by the dotted line 97 is within the lustrous zone 95. Although the lines 96 and 97 are shown as meeting at the corners 99, it will be evident that in actual practice the line 96 may extend laterally in both directions slightly beyond the corners 99, so as to insure that the surface 97 is wholly within the lustrous zone.

The shirt button blanks shown at 76 in FIG. 1 are similarly provided with enlarged heads or flanges as indicated at 93, and it will be understood that for reasons similar to those explained in connection with the shank button blank of FIG. 3, upon cutting away of the excess material, a finished button will be obtained having a lustrous or mother-of-pearl appearance over the whole face thereof.

When the cavities are all in the low part of the mold, the other part presenting a continuously flat surface as in FIGS. 5 and 6, certain of the advantages of the invention can be realized by the use of only a single highly stretchable film provided that the film is interposed between the resinous composition and the cavities. The second film can in such case be replaced by a brushed-on or sprayed-on coating on the face of the upper mold part of a separating compound or lubricant to which the resin is inert. The stretchable film is then placed over the cavities and the resin deposited on the film, and the cavity-free top half with the coating thereon directly contacts the resin. It is desirable that the spring-pressed retaining ring 83 be disposed on that mold part which contains the cavities so that it will be protected by the film against access of the resin which, under the pressure of the mold, would otherwise be forced into the spring chambers 65.

While we have described our invention as applied to the manufacture of buttons, it will be evident that our process is of wide application for the molding of a great variety of articles and of different sizes, such as knife handles, parts for toys and games, articles of jewelry, and other ornamental objects, boxes, casings for various types of instruments, etc.

We claim:

1. Process for the manufacture of articles having a pearlescent luster which comprises providing a mold part having therein a cavity corresponding to the size of the article to be molded and having at its open end an enlargement in the form of a flange of such extent that the lustrous region within the molded article to be formed in said cavity will extend to at least the actual periphery of said article when finished, molding an addition type resin containing a pearlescence-producing substance therein in said cavity, removing the molded article from the mold, and cutting away the flange material at the face of the article to expose a face having a pearlescent luster over the whole area thereof.

2. Process according to claim 1, wherein a sheet of cardboard having a relatively rough surface is interposed between the mass of resin and a second mold part, whereby a pearlescent effect with ripples therein is obtained.

References Cited by the Examiner
UNITED STATES PATENTS

| | | | |
|---|---|---|---|
| 1,619,734 | 3/1927 | Jeppson et al. | 264—71 |
| 2,652,597 | 9/1953 | Sucher | 264—316 |
| 2,962,764 | 12/1960 | Trojanowski et al. | 264—297 |
| 2,962,767 | 12/1960 | Trojanowski et al. | 264—313 |

ROBERT F. WHITE, *Primary Examiner.*

S. A. HELLER, *Assistant Examiner.*